United States Patent
Garg et al.

(10) Patent No.: US 9,606,926 B2
(45) Date of Patent: Mar. 28, 2017

(54) SYSTEM FOR PRE-FETCHING DATA FRAMES USING HINTS FROM WORK QUEUE SCHEDULER

(71) Applicants: Vakul Garg, Shahdara (IN); Bharat Bhushan, Tehsil Rewari (IN)

(72) Inventors: Vakul Garg, Shahdara (IN); Bharat Bhushan, Tehsil Rewari (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 209 days.

(21) Appl. No.: 14/556,143

(22) Filed: Nov. 29, 2014

(65) Prior Publication Data

US 2016/0154737 A1    Jun. 2, 2016

(51) Int. Cl.
*G06F 12/00*    (2006.01)
*G06F 12/0862*  (2016.01)

(52) U.S. Cl.
CPC .. *G06F 12/0862* (2013.01); *G06F 2212/1021* (2013.01); *G06F 2212/6028* (2013.01)

(58) Field of Classification Search
CPC ..... G06F 2212/1021; G06F 2212/6028; G06F 2212/602; G06F 12/0862
See application file for complete search history.

(56) References Cited

U.S. PATENT DOCUMENTS

| | | | |
|---|---|---|---|
| 6,016,315 A * | 1/2000 | Chambers | H04L 49/90 370/378 |
| 7,194,582 B1 | 3/2007 | Diefendorff | |
| 7,631,106 B2 | 12/2009 | Goldenberg | |
| 8,140,759 B2 | 3/2012 | Frey | |
| 8,347,039 B2 | 1/2013 | Boyle | |
| 2003/0097498 A1* | 5/2003 | Sano | H04L 49/10 710/22 |
| 2004/0123043 A1* | 6/2004 | Rotithor | G06F 12/0215 711/137 |
| 2015/0249620 A1* | 9/2015 | Folsom | H04L 45/566 370/392 |

* cited by examiner

*Primary Examiner* — Larry T Mackall
(74) *Attorney, Agent, or Firm* — Charles E. Bergere

(57) ABSTRACT

A system for pre-fetching a data frame from a system memory to a cache memory includes a processor, a queue manager, and a pre-fetch manager. The processor issues a de-queue request associated with the data frame. The queue manager receives the de-queue request, identifies a frame descriptor associated with the data frame, and generates a pre-fetch hint signal. The pre-fetch manager receives the pre-fetch hint signal and generates a pre-fetch signal and enables the cache memory to pre-fetch the data frame. Subsequently, the queue manager de-queues the frame descriptor. The processor receives the frame descriptor and reads the data frame from the cache memory.

14 Claims, 4 Drawing Sheets

SYSTEM FOR PRE-FETCHING DATA FRAMES USING HINTS FROM WORK QUEUE SCHEDULER

BACKGROUND OF THE INVENTION

The present invention relates generally to communication networks, and, more particularly, to a system for pre-fetching data frames using hints from a work queue scheduler.

A communication network typically includes multiple digital systems including gateways, switches, access points and base stations. These digital systems exchange data packets (also referred to as data frames) and manage data transmissions across multiple digital systems. A digital system includes at least one processor or hardware accelerator that performs logical and mathematical operations on the data frames.

The hardware accelerator or the processor performs the logical and mathematical operations by executing multiple instructions that are stored in multiple memories of the digital system. The memories are also used to store the data frames. The time required by the processor (or the hardware accelerator) to access the data frames stored in the memories is referred to as access time, which is proportional to the proximity of the memories to the processor. The access time also depends on the memory type. The access time is measured as a count of machine cycles required by the processor to access the data frames from the memories. The lower the access time, the faster the processor can process the data frames, thereby resulting in increased throughput and improved system performance. However, memories with low access time are more expensive than memories with high access time.

The digital system includes two types of memories, cache memory and system memory. The cache is located closer to the processor (or the hardware accelerator) than the system memory, and typically is smaller and has a faster read time, hence, a low access time. However, since cache memory is smaller and more expensive than system memory, the cache typically is not big enough to store all the data frames received from other digital systems in the network. For example, the cache memory may comprise one of a static random-access memory (SRAM) and a flash memory, while the system memory comprises dynamic random-access memory (DRAM). Thus, the system memory is used for storing the data frames received from the communication network. However, fetching the data frames from the system memory leads to processing delays. To improve performance, conventional digital systems pre-fetch some data frames from the system memory and store them in the cache.

When the processor requires a data frame, the processor checks for availability of the required data frame in the cache. If the required data frame is available in the cache, it is referred to as a cache hit. For cache hits, the processor reads the required data frame from the cache. However, if the required data frame is not available in the cache, it is referred to as a cache miss. For a cache miss, the processor reads the required data frame from the system memory, thereby resulting in a delay. Thus, it is necessary to identify the data frames required for subsequent processing and pre-fetch the identified data frames from the system memory to the cache to reduce the number of cache misses.

One pre-fetching technique includes stashing of a subset of the data frames in the cache. The subset of the data frames is concurrently stored in the system memory. When the processor requests access to a first data frame of the subset, the first data frame is available in the cache. However, if the time from when the subset of the data frames is stashed to when the processor requests the first data frame exceeds a cache-flush time period, the cache will evict the subset of the data frames. The subset of the data frames stashed in the cache memory also may be overwritten. Therefore, the processor will not find the first data frame in the cache and must retrieve it from the system memory.

Another pre-fetching technique includes predicting a subset of data frames that will be required by the processor and pre-fetching this subset of the data frames from the system memory to the cache. A prediction algorithm is used to monitor cache misses that occur due to the absence of requested data frames in the cache memory. The prediction algorithm identifies addresses associated with the requested data frames that resulted in the cache misses, and then identifies a predicted set of addresses based on the addresses associated with the requested data frames that resulted in the cache misses. The subset of data frames associated with the predicted set of addresses is then pre-fetched and stored in the cache. However, the processor may require only a few predicted addresses of the predicted set of addresses for processing. The remaining predicted addresses of the predicted set of addresses are not used. The machine cycles required to pre-fetch these unused data frames are wasted. Further, since the prediction algorithm requires initial cache misses, this technique results in delay in the processing of the data frames and results in performance degradation of the digital system.

Therefore it would be advantageous to have a system and method for pre-fetching of data frames to the cache that reduces the number or occurrence of cache misses.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
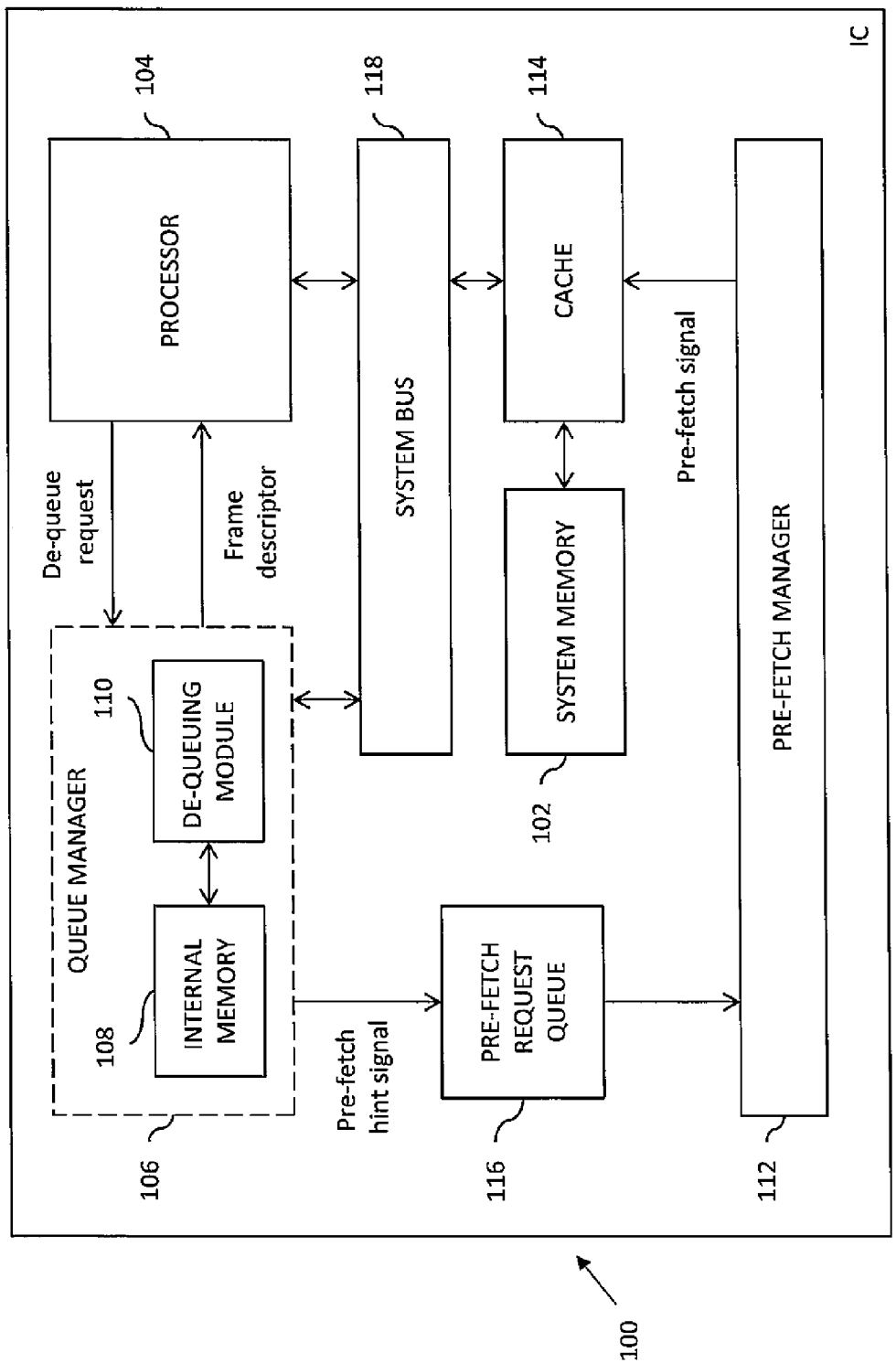
FIG. 1 is a schematic block diagram of an integrated circuit for pre-fetching data frames in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for pre-fetching a data frame from a system memory is provided. The system includes a data processing module, a queue manager, a pre-fetch manager, and a cache memory. The data processing module generates a de-queue request associated with the data frame. The queue manager stores a frame queue that includes a frame descriptor associated with the data frame. The queue manager receives the de-queue request, identifies the frame descriptor based on the de-queue request, and generates a pre-fetch hint signal. The pre-fetch manager receives the pre-fetch hint signal and generates a pre-fetch signal. The cache memory receives the pre-fetch signal and pre-fetches the data frame based on the pre-fetch signal.

In another embodiment of the present invention, a method for pre-fetching a plurality of data frames in a system is provided. The system includes a data processing module, a queue manager, a pre-fetch manager, a system memory, and a cache memory. The system memory stores the plurality of data frames. The queue manager stores a plurality of frame queues. Each frame queue includes a plurality of frame descriptors. Each frame descriptor is associated with a corresponding data frame of the plurality of data frames. The method includes receiving a de-queue request for a first data frame of the plurality of data frames. A first frame queue of the plurality of frame queues is identified based on the de-queue request. A first frame descriptor associated with the first data frame is identified from the plurality of frame descriptors of the first frame queue based on the de-queue request. A pre-fetch hint signal is generated. A pre-fetch signal is generated based on the pre-fetch hint signal. The first data frame is pre-fetched from the system memory to the cache memory based on the pre-fetch signal.

In yet another embodiment of the present invention, an integrated circuit is provided. The integrated circuit includes a system memory, an internal memory, a data processing module, a de-queuing module, a pre-fetch manager, and a cache memory. The system memory stores a plurality of data frames. The internal memory stores a plurality of frame queues. Each frame queue includes a plurality of frame descriptors. Each frame descriptor is associated with a corresponding data frame of the plurality of data frames. The data processing module generates a de-queue request associated with a first data frame of the plurality of data frames. The de-queuing module receives the de-queue request, identifies a first frame queue of the plurality of frame queues based on the de-queue request, identifies a first frame descriptor associated with the first data frame from the plurality of frame descriptors of the first frame queue, and generates a pre-fetch hint signal. The pre-fetch manager receives the pre-fetch hint signal and generates a pre-fetch signal. The cache memory receives the pre-fetch signal and pre-fetches the first data frame from the system memory based on the pre-fetch signal.

Various embodiments of the present invention provide a system for pre-fetching a data frame from a system memory. The system includes a data processing module, a queue manager, a pre-fetch manager, and a cache memory. The system memory stores the plurality of data frames. The queue manager stores a plurality of frame queues. Each frame queue includes a plurality of frame descriptors. Each frame descriptor is associated with a corresponding data frame of the plurality of data frames. The data processing module, examples of which include a hardware accelerator or a processor, generates a de-queue request associated with the data frame. The queue manager receives the de-queue request, identifies a frame descriptor based on the de-queue request, and generates a pre-fetch hint signal. The pre-fetch manager receives the pre-fetch hint signal and generates a pre-fetch signal. The cache memory receives the pre-fetch signal and pre-fetches the data frame based on the pre-fetch signal. Subsequently, the queue manager de-queues the frame descriptor. The data processing module receives the frame descriptor and reads the data frame from the cache memory. Similarly, data frames associated with all de-queue requests are pre-fetched in to the cache memory prior to requirement by the data processing module, thereby ensuring that the requests for the data frames from the cache memory by the data processing module result in cache hits for all the data frames. Therefore, the data processing module does not access the system memory to retrieve the data frames and prevents the delay. The processing time of the data frame reduces and the throughput and the overall performance of the system increase.

Referring now to FIG. 1, a schematic block diagram of an integrated circuit (IC) 100 for pre-fetching a plurality of data frames in accordance with an embodiment of the present invention is shown. The IC 100 is included in a digital system (not shown) that is connected to multiple digital systems in a communication network. The IC 100 receives the plurality of data frames (hereinafter referred to as "data frames") from other digital systems in the communication network.

The IC 100 includes a system memory 102, a data processing module 104, a queue manager 106 comprising an internal memory 108 and a de-queuing module 110, a pre-fetch manager 112, a cache memory 114, a pre-fetch request queue 116 and a system bus 118. The data processing module 104 is connected to the queue manager 106. The queue manager 106 is connected to the pre-fetch manager 112 by way of the pre-fetch request queue 116. The pre-fetch manager 112 is connected to the cache memory 114. The cache memory 114 is connected to the system memory 102 and the system bus 118.

The system memory 102 is connected to the cache memory 114. The IC 100 receives the data frames through a network interface, such as Ethernet or wireless local area network (WLAN) and stores the data frames in the system memory 102. In an example, the system memory 102 is a dynamic random access memory (DRAM). Since the system memory 102 comprises of a memory such as the DRAM and is located at a greater distance as compared to the cache memory 114, the access time of the system memory 102 is higher as compared to the cache memory 114. The data frames that are required by the data processing module 104 for processing are pre-fetched from the system memory 102 to the cache memory 114 prior to requirement by the data processing module 104.

The data frames include different types of information and pre-fetching of the data frames depends on the type of information encapsulated in the data frames. In an example, the data frames that include information such as audio data and video data are allowed to be pre-fetched. The data frames that include information comprising cryptographic data such as digital signatures or authentication certificates are not allowed to be pre-fetched. To facilitate selective pre-fetching of the data frames, each data frame has a pre-fetch characteristic associated therewith.

The data processing module 104 is connected to the queue manager 106 and the cache memory 114 by way of the system bus 118. The data processing module 104 identifies a requirement of a first data frame of the data frames stored in the system memory 102 for subsequent processing. The data processing module 104 generates a de-queue request for the first data frame. Subsequently, the data processing module 104 sends the de-queue request to the queue manager 106. During subsequent processing, the data processing module 104 generates read requests to the cache memory 114 for the data frames. In an embodiment of the present invention, the data processing module 104 is at least one of but not limited to a processor core, a co-processor, an application-specific integrated circuit, a micro-controller and a control unit. In another embodiment of the present invention, the data processing module 104 is a hardware accelerator such as a cryptographic accelerator, a transmission control protocol (TCP) accelerator, a three-dimension (3D) accelerator, a graphic accelerator, and ICs programmed for computationally intensive functions.

The queue manager 106 is connected to the data processing module 104 and the pre-fetch request queue 116. The queue manager 106 includes the internal memory 108, an en-queuing module (not shown) and the de-queuing module 110. The internal memory 108 stores a plurality of frame queues.

Figure 2:
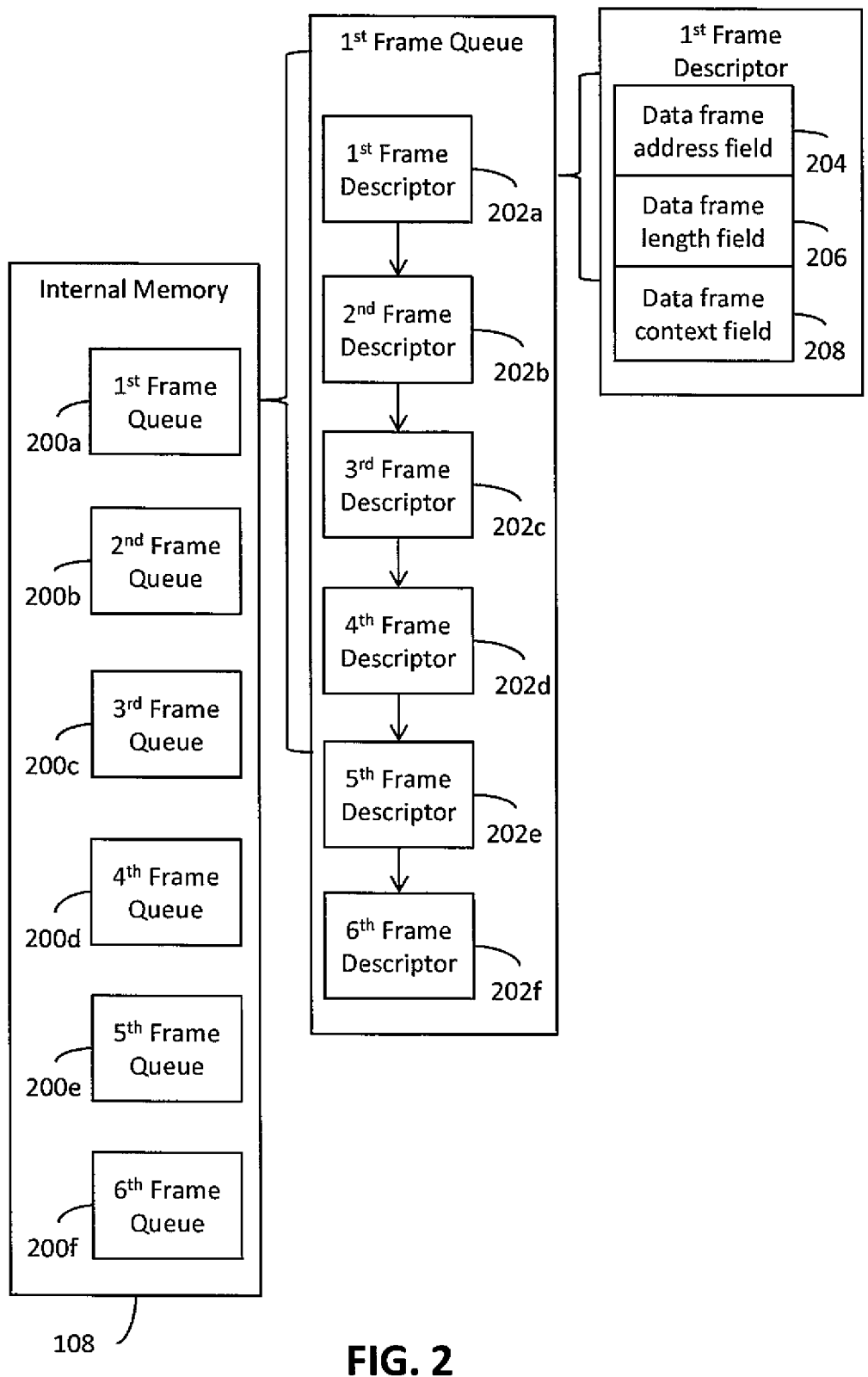
FIG. 2 is a schematic block diagram illustrating the structures of a plurality of frame queues in accordance with an embodiment of the present invention.

Referring now to FIG. 2, a schematic block diagram illustrating the structures of the plurality of frame queues of the internal memory 108 in accordance with an embodiment of the present invention is shown. The internal memory 108 stores the plurality of frame queues that includes first through sixth frame queues 200a-200f (collectively referred to as frame queues 200). Each frame queue 200 includes a plurality of frame descriptors. The first frame queue 200a includes first through sixth frame descriptors 202a-202f (collectively referred to as frame descriptors 202).

The en-queuing module en-queues the data frames in the frame queues 200. The en-queuing module 110 associates the frame descriptors 202 with the corresponding data frames, thereby en-queuing the data frames in the frame queue 200a. The frame descriptors 202 are associated with corresponding data frames that are stored in the system memory 102. In an example, the en-queuing module associates the first data frame with the first frame descriptor 202a.

Each frame descriptor 202 includes information indicative of an address, a size and a context of the corresponding data frame. In the example, the first frame descriptor 202a that is associated with the first data frame includes a data frame address field 204 indicative of an address of the system memory 102 that stores the first data frame, a data frame length field 206 that indicates a size of the first data frame, and a data frame context field 208.

Further, each frame descriptor 202 is associated with a pre-fetch attribute indicative of a pre-fetch characteristic of a corresponding data frame. In the example, the first frame descriptor 202a is associated with the pre-fetch attribute indicative of the pre-fetch characteristic of the first data frame. In an embodiment of the present invention, the pre-fetch attribute is associated with a frame queue 200 that includes the frame 202 descriptor. In the example, the first frame queue 200a includes the pre-fetch attribute indicative of the pre-fetch characteristic of the first data frame.

The de-queuing module 110 receives the de-queue request from the data processing module 104. The de-queuing module 110 identifies the first frame queue 200a based on the de-queue request. Subsequently, the de-queuing module 110 identifies the first frame descriptor 202a. Subsequent to the identification of the first frame descriptor 202a, the de-queuing module 110 checks the pre-fetch attribute associated with at least one of the first frame queue 200a and the first frame descriptor 202a to determine the pre-fetch characteristic of the first data frame.

If the de-queuing module 110 determines that the pre-fetch characteristic of the first data frame is enabled, i.e., pre-fetching of the first data frame is allowed, the de-queuing module 110 generates a pre-fetch hint signal. The pre-fetch hint signal includes information indicative of the address and the size of the first data frame. The pre-fetch hint signal is used by the pre-fetch manager 112 to pre-fetch the first data frame from the system memory 102 to the cache memory 114. Subsequent to the generation of the pre-fetch hint signal, the de-queuing module 110 de-queues the first frame descriptor 202a to the data processing module 104. The queue manager 106 receives the de-queue request and generates the pre-fetch hint signal based on the de-queue request.

However, if the de-queuing module 110 determines that the pre-fetch characteristic of the first data frame is disabled, the de-queuing module 110 skips the generation of the pre-fetch hint signal and de-queues the first frame descriptor 202a to the data processing module 104.

The pre-fetch request queue 116 is connected between the queue manager 106 and the pre-fetch manager 112. The pre-fetch request queue 116 operates as a buffer interface between the queue manager 106 and the pre-fetch manager 112 for relaying the pre-fetch hint signal. The pre-fetch request queue 116 receives the pre-fetch hint signal from the queue manager 106, stores the pre-fetch hint signal and transmits the pre-fetch hint signal to the pre-fetch manager 112. In an embodiment of the present invention, the pre-fetch request queue 116 is implemented as an internal system memory (not shown) that is included in the pre-fetch manager 112. In another embodiment of the present invention, the pre-fetch request queue 116 is referred to as a pre-fetch manager portal.

The pre-fetch manager 112 is connected to the pre-fetch request queue 116 and the cache memory 114. The pre-fetch manager 112 facilitates the pre-fetching of the first data frame from the system memory 102 to the cache memory 114. The pre-fetch manager 112 generates a pre-fetch signal based on the pre-fetch hint signal. Subsequently, the pre-fetch manager 112 enables pre-fetching of the first data frame from the system memory 102 to the cache memory 114 based on the pre-fetch signal.

In an embodiment of the present invention, the pre-fetch manager 112 includes a singleton buffer, a streaming engine buffer and a pre-fetch tracking engine (collectively not shown). The pre-fetch manager 112 identifies and allocates information indicative of the address and the size of the first data frame based on the pre-fetch hint signal to the singleton buffer. Subsequently, the pre-fetch manager 112 promotes the singleton buffer to the streaming engine buffer. Subsequently, the streaming engine buffer generates the pre-fetch signal to initiate pre-fetching of the first data frame from the system memory 102 to the cache memory 114. The cache memory 114 includes multiple cache lines that store segments of the pre-fetched first data frame. Concurrently, the pre-fetch tracking engine tracks the consumption of the aforementioned cache lines by the data processing module 104 and initiates pre-fetching of data frames subsequent to the first data frame that may be required by the data processing module 104 for subsequent processing.

The cache memory 114 is connected to the pre-fetch manager 112, the system memory 102 and the system bus 118. The cache memory 114 receives the pre-fetch signal from the pre-fetch manager 112 and pre-fetches the first data frame from the system memory 102 based on the pre-fetch signal. In an example, the cache memory 114 is a core-net platform cache (CPC). The CPC serves as a general purpose cache, an input-output stash, a memory-mapped static random-access memory (SRAM), or a combination of the aforementioned functions. The low access time of the cache memory 114 allows the cache memory 114 to be suitable for storing pre-fetched data frames, thereby reducing the number of machine cycles required to process data frames and hence, increasing the processing speed of the data processing module 104.

The system bus 118 connects the queue manager 106, the data processing module 104, and the cache memory 114. The data transfer between the data processing module 104 and the cache memory 114 takes place by the way of the system bus 118. In an example, the system bus 118 is a core-net coherency fabric (CCF). The CCF provides a communication channel to transfer data from source to destination components connected to the CCF.

In operation, the data processing module 104 generates and provides the de-queue request associated with the first data frame to the queue manager 106. The queue manager 106 generates and provides the pre-fetch hint signal based on the first frame descriptor 202a associated with the first data frame to the pre-fetch manager 112. The pre-fetch manager 112 generates the pre-fetch signal and enables pre-fetching of the first data frame from the system memory 102 to the cache memory 114. The cache memory 114 stores the first data frame. Subsequently, the queue manager 106 de-queues the first frame descriptor 202a. The data processing module 104 receives the first frame descriptor 202a from the queue manager 106. Based on the first frame descriptor 202a, the data processing module 104 sends a read request for the first data frame to the system bus 118. The cache memory 114 receives the read request through the system bus 118. Since, the first data frame is pre-fetched to the cache memory 114, a cache hit for the read request is ensured. The cache memory 114 transmits the first data frame to the data processing module 104 by the way of the system bus 118. Since the read request does not generate cache misses, the data processing module 104 does not access the system memory 102 to retrieve the first data frame, thereby preventing delay and reducing the processing time of the first data frame. Thus, the throughput of the IC 100 is increased and the overall performance is improved.

Figure 3:
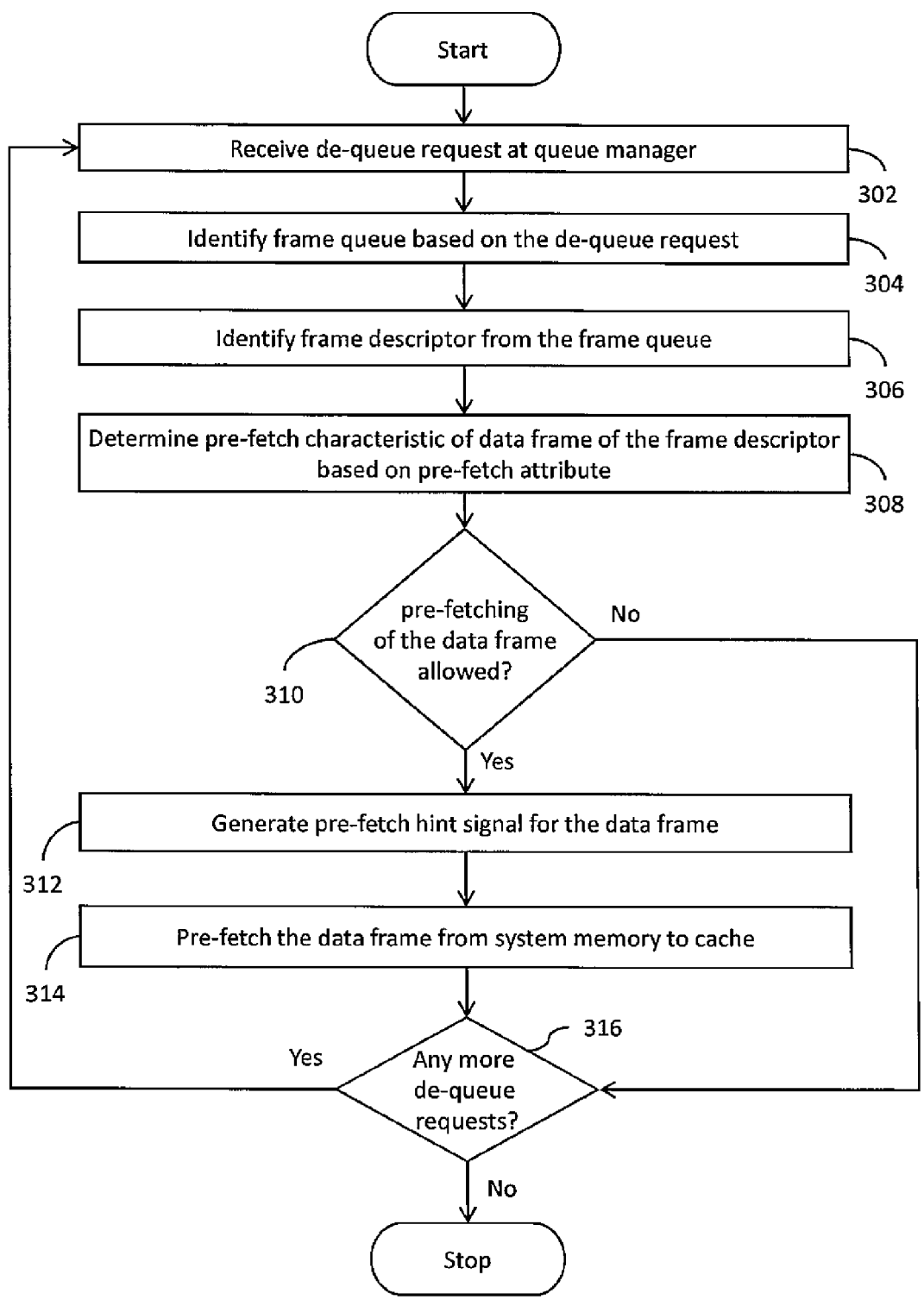
FIG. 3 is a flow chart illustrating a method for pre-fetching data frames from a system memory to a cache memory in accordance with an embodiment of the present invention.

Referring now to FIG. 3, a flowchart illustrating a method for pre-fetching the plurality of data frames from the system memory 102 to the cache memory 114 in accordance with an embodiment of the present invention is shown. At step 302, the queue manager 106 receives the de-queue request associated with the first data frame from the data processing module 104. At step 304, the queue manager 106 identifies the first frame queue 200a based on the de-queue request. At step 306, the queue manager 106 identifies the first frame descriptor 202a associated with the first data frame. At step 308, the queue manager 106 reads the pre-fetch attribute associated with at least one of the first frame queue 200a and the first frame descriptor 202a and determines the pre-fetch characteristic of the first data frame. At step 310, the queue manager 106 checks to determine if pre-fetching of the first data frame is allowed. If at step 310, the queue manager 106 determines that pre-fetching of the first data frame is allowed, step 312 is executed. At step 312, the queue manager 106 generates the pre-fetch hint signal for the first data frame based on the first frame descriptor 202a. At step 314, the pre-fetch manager 112 receives the pre-fetch hint signal and generates the pre-fetch signal to enable the cache memory 114 to pre-fetch the first data frame from the system memory 102.

However, if at step 310, the queue manager 106 determines that pre-fetching of the first data frame is not allowed, step 316 is executed. At step 316, the queue manager 106 checks to determine whether any more de-queue requests are received. If at step 316, the queue manager 106 determines that more de-queue requests are received, step 302 is executed.

Figure 4:
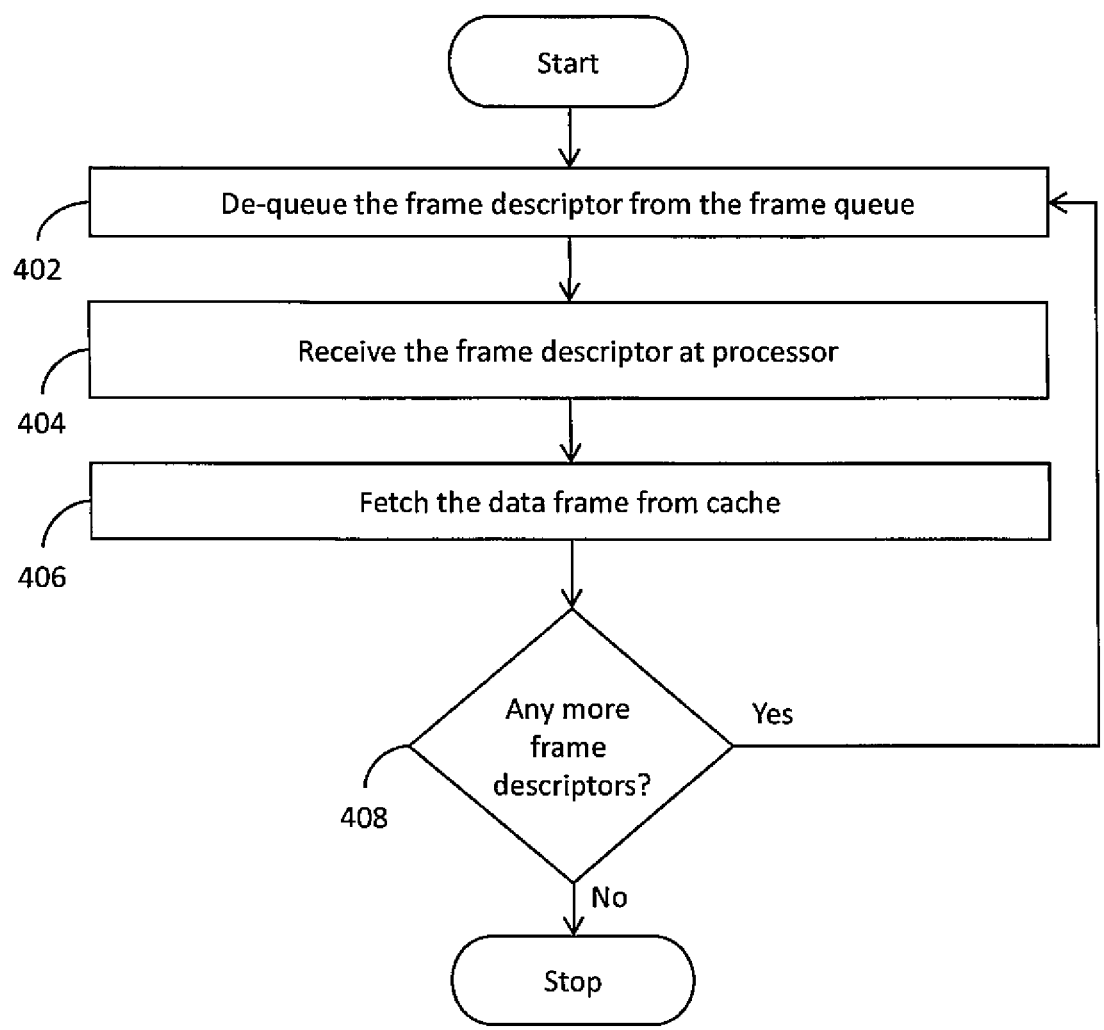
FIG. 4 is a flow chart illustrating a method for fetching data frames from a cache memory to a processor in accordance with an embodiment of the present invention.

Referring now to FIG. 4, a flowchart illustrating a method for fetching the plurality of data frames from the cache memory 114 to the data processing module 104 in accordance with an embodiment of the present invention is shown. At step 402, the queue manager 106 de-queues the first frame descriptor 202a to the data processing module 104. At step 404, the data processing module 104 receives the first frame descriptor 202a. At step 406, the data processing module 104 fetches the first data frame from the cache memory 114. At step 408, the data processing module 104 checks to determine whether any more frame descriptors are received. If at step 408, the data processing module 104 determines that more frame descriptors are received, step 402 is executed.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for pre-fetching a data frame from a system memory, comprising:
    a data processing module for generating a de-queue request associated with the data frame;
    a queue manager connected to the data processing module for receiving the de-queue request, storing a frame queue that includes a frame descriptor associated with the data frame, identifying the frame descriptor based on the de-queue request, and generating a pre-fetch hint signal;
    a pre-fetch manager connected to the queue manager for receiving the pre-fetch hint signal and generating a pre-fetch signal; and
    a cache memory connected to the pre-fetch manager for receiving the pre-fetch signal and connected to the system memory for pre-fetching the data frame based on the pre-fetch signal,
    wherein the queue manager further de-queues the frame descriptor from the frame queue and provides the frame descriptor to the data processing module subsequent to storing the first data frame in the cache memory, and the data processing module fetches the data frame from the cache memory based on the frame descriptor received from the queue manager.

2. The system of claim 1, wherein a pre-fetch attribute is associated with at least one of the frame queue and the frame descriptor and indicates a pre-fetch characteristic of the data frame corresponding to the frame descriptor included in the frame queue.

3. The system of claim 2, wherein the queue manager generates the pre-fetch hint signal based on the pre-fetch characteristic of the data frame.

4. The system of claim 3, wherein the frame descriptor includes a data frame address field that stores an address of the data frame and a data frame length field that indicates a size of the data frame, and wherein the pre-fetch hint signal includes information indicative of the address and the size of the data frame.

5. The system of claim 1, further comprising a pre-fetch request queue connected to the queue manager for receiving the pre-fetch hint signal, storing the pre-fetch hint signal, and transmitting the pre-fetch hint signal to the pre-fetch manager.

6. The system of claim 1, wherein the system memory further stores a plurality of data frames.

7. The system of claim 6, wherein the queue manager further stores a plurality of frame queues, and wherein each frame queue includes a plurality of frame descriptors, and wherein each frame descriptor is associated with a corresponding data frame of the plurality of data frames.

8. The system of claim 1, wherein the data processing module comprises at least one of a hardware accelerator, a processor core, a co-processor, an application-specific integrated circuit, and a control unit.

9. A method for pre-fetching a plurality of data frames in a system that includes a data processing module, a pre-fetch manager, a cache memory, a system memory that stores the plurality of data frames, and a queue manager that stores a plurality of frame queues, wherein each frame queue includes a plurality of frame descriptors, and wherein each frame descriptor is associated with a corresponding data frame of the plurality of data frames, the method comprising:

receiving a de-queue request associated with a first data frame of the plurality of data frames;

identifying a first frame queue of the plurality of frame queues based on the de-queue request;

identifying a first frame descriptor of the plurality of frame descriptors of the first frame queue based on the de-queue request, wherein the first frame descriptor is associated with the first data frame;

generating a pre-fetch hint signal;

generating a pre-fetch signal based on the pre-fetch hint signal;

pre-fetching the first data frame from the system memory to the cache memory based on the pre-fetch signal;

de-queuing the first frame descriptor from the first frame queue and providing the first frame descriptor to the data processing module subsequent to storing the first data frame in the cache memory; and fetching the first data frame from the cache memory to the data processing module based on the frame descriptor received by the data processing module.

10. The method of claim 9, wherein a pre-fetch attribute is associated with at least one of the first frame queue and the first frame descriptor and indicates a pre-fetch characteristic of the first data frame corresponding to the first frame descriptor of the first frame queue.

11. The method of claim 10, further comprising generating the pre-fetch hint signal based on the pre-fetch characteristic of the first data frame, wherein the pre-fetch hint signal includes information indicative of address and size of the first data frame.

12. An integrated circuit, comprising:

a system memory for storing a plurality of data frames;

an internal memory for storing a plurality of frame queues, wherein each frame queue includes a plurality of frame descriptors, and wherein each frame descriptor is associated with a corresponding data frame of the plurality of data frames;

a data processing module for generating a de-queue request associated with a first data frame of the plurality of data frames;

a de-queuing module connected to the data processing module for receiving the de-queue request and the internal memory, identifying a first frame queue of the plurality of frame queues based on the de-queue request, identifying a first frame descriptor of the plurality of frame descriptors of the first frame queue, and generating a pre-fetch hint signal, wherein the first frame descriptor is associated with the first data frame;

a pre-fetch manager connected to the de-queuing module for receiving the pre-fetch hint signal and generating a pre-fetch signal; and a cache memory connected to the pre-fetch manager for receiving the pre-fetch signal and the system memory for pre-fetching the first data frame from the system memory based on the pre-fetch signal, wherein the de-queuing module further de-queues the first frame descriptor from the first frame queue and provides the first frame descriptor to the data processing module subsequent to storing the first data frame in the cache memory, and the data processing module fetches the first data frame from the cache memory based on the first frame descriptor received from the de-queuing module.

13. The integrated circuit of claim 12, wherein a pre-fetch attribute is associated with at least one of the first frame queue and the first frame descriptor and indicates a pre-fetch characteristic of the first data frame corresponding to the first frame descriptor of the first frame queue.

14. The integrated circuit of claim 13, wherein the queue manager generates the pre-fetch hint signal based on the pre-fetch characteristic of the first data frame, and wherein the pre-fetch hint signal includes information indicative of address and size of the first data frame.

* * * * *